United States Patent [19]

Dietrich et al.

[11] 4,146,066

[45] Mar. 27, 1979

[54] METHOD OF INTRODUCING REACTION MIXTURES FOR SINGLE-COMPONENT FOAMS INTO PRESSURE CONTAINERS

[75] Inventors: Manfred Dietrich, Leverkusen; Peter Herweg, Burscheid; Hans G. Vleurinck, Leverkusen, all of Fed. Rep. of Germany; Dietmar Benner, Coraopolis, Pa.

[73] Assignee: Bayer Aktiengesellschaft, Leverkusen, Fed. Rep. of Germany

[21] Appl. No.: 903,307

[22] Filed: May 5, 1978

[30] Foreign Application Priority Data

May 28, 1977 [DE] Fed. Rep. of Germany ....... 2724256

[51] Int. Cl.² .............................................. B65B 3/04
[52] U.S. Cl. ...................................................... 141/9
[58] Field of Search ...................................... 141/1–12, 141/69–80, 100–110, 236–248

[56] References Cited

U.S. PATENT DOCUMENTS 4,010,777  3/1977  Mogensen ................................. 141/9

Primary Examiner—Houston S. Bell, Jr.
Attorney, Agent, or Firm—Gene Harsh; Joseph C. Gil

[57] ABSTRACT

The invention relates to a method of introducing reaction mixtures for single-component foams into pressure containers. The reaction mixture comprises at least two reaction components and a blowing agent and is formed in an injection mixing head. The reaction mixture is then introduced into an evacuated pressure bottle provided with a valve. Additional pure blowing agent is added via the injection mixhead subsequent to the introduction of the reaction mixture into the pressure container.

4 Claims, 1 Drawing Figure

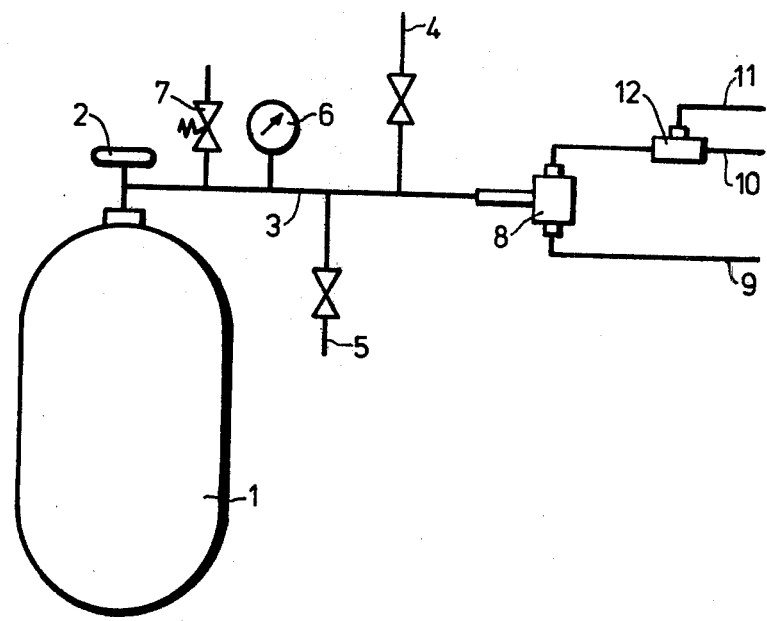

METHOD OF INTRODUCING REACTION MIXTURES FOR SINGLE-COMPONENT FOAMS INTO PRESSURE CONTAINERS

BACKGROUND OF THE INVENTION

Single-component foam systems, particularly those based on a polyisocyanate, consist of a prepolymer which is foamed with a blowing agent, for example a halo-alkane such as Freon R-12. The uncured foam is reasonably stable and is cured by reacting the prepolymer with atmospheric moisture diffused therein.

The reaction mixtures for single-component foams have so far been prepared by two methods:

(1) The prepolymer is prepared in a pressure chamber and then displaced with blowing agent. The reaction mixture is then introduced into a pressure container provided with a valve. The valve must be cleansed in a subsequent operation. This method is mainly used for filling large pressure containers.

(2) Smaller pressure containers (capacity 1 liter or less) are charged with the valves removed therefrom. The reaction components are introduced into an open pressure container, the container is closed with the valve, and blowing agent is added. The container is subsequently shaken.

The first method needs expensive equipment and is slow. It is also difficult to cleanse the chamber installation. Using the second method, the contents of the containers are frequently not mixed sufficiently and lumps are formed which block the valve.

DESCRIPTION OF THE INVENTION

The object of the present invention is to provide a method of introducing reaction mixtures for single-component foams into pressure containers. The object is achieved by forming the reaction mixture in an injection mixing head and by adding further pure blowing agent via the injection mixing head immediately after introducing the reaction mixture into the pressure container.

The method according to the invention is suitable for filling both large and small pressure containers.

The valve and the mixing head are cleansed by the addition of pure blowing agent at the end of the filling process. The valve is prevented from sticking and associated interruptions for the user are avoided. A highly homogenous reaction mixture can be introduced into the bottles using known injection mixing heads.

The method is particularly suitable for introducing polyurethane foams. In this case, the reaction mixture is composed of a polyol, a polyisocyanate and a blowing agent, usually a haloalkane.

The apparatus required for carrying out the method is known and is commercially available. The reaction components are introduced from storage containers under low pressure (for example 3 bar) into high-pressure piston metering pumps and are conveyed to the injection mixing head under a pressure of about 150 bar. The components are mixed in the injection mixing head by inpingment mixing. The reaction mixture is rapidly conveyed into an evacuated pressure container. The reaction mixture reacts to form a prepolymer. The reaction heat produced is removed in known manner.

The blowing agent may be introduced into the reaction mixture at several points in the system. It may be injected directly into the mixing head or into one of the reaction component pipes upstream of the mixing head. It may be advantageous or necessary in certain circumstances to provide several points for introduction in order to clean various parts of the apparatus with the blowing agent.

The method is illustrated in the drawing and is described in more detail below by way of Example. The pressure container 1 to be filled is connected to a pipe 3 via a valve 2 which is already installed. The pipe 3 and the container may be evacuated via 4 and purged with nitrogen via 5. The apparatus is also provided with a pressure measuring instrument 6 and a safety valve 7. The prepolymer is formed in an injection mixing head 8 from two reaction components 9 and 10 and is forced into the pipe 3. Blowing agent 11 is subsequently introduced via an inoculation pad 12 into the pressure pipe 10. In this example the blowing agent is a freon and the pressure pipe 10 carries a polyol. The pressure container 1 is filled with a homogenous mixture in a very short time. The container is ready for use after being cooled.

What is claimed is:

1. In a method of introducing reaction mixtures for single-component foams into pressure containers, the improvement which comprises forming a reaction mixture comprising at least two reaction components and a blowing agent in an injection mixing head; introducing the reaction mixture into evacuated pressure containers provided with a valve; and adding additional pure blowing agent through the injection mixing head immediately after introducing the reaction mixture into the pressure container.

2. The method of claim 1 wherein the reaction mixture is composed of a polyisocyanate, a polyol and a haloalkane.

3. The method of claim 1, wherein the blowing agent is injected directly into the injection mixing head.

4. The method of claim 1, wherein the blowing agent is injected into one or all pipes carrying the reaction components upstream of the injection mixing head.

* * * * *